US006758465B1

(12) United States Patent
Greenhill et al.

(10) Patent No.: US 6,758,465 B1
(45) Date of Patent: Jul. 6, 2004

(54) WAVE SPRING WITH SINGLE SHIM END

(75) Inventors: Mark Greenhill, Winnetka, IL (US); Michael Greenhill, Highland Park, IL (US)

(73) Assignee: Smalley Steel Ring Company, Lake Zurich, IL (US)

(*) Notice: Subject to any disclaimer, the term of this patent is extended or adjusted under 35 U.S.C. 154(b) by 76 days.

(21) Appl. No.: 10/090,967

(22) Filed: Mar. 5, 2002

(51) Int. Cl.[7] .................................................. F16F 1/06
(52) U.S. Cl. ...................................... 267/166; 267/162
(58) Field of Search .............................. 267/161–167, 267/170, 174, 179

(56) References Cited

U.S. PATENT DOCUMENTS

| 4,752,178 A | * | 6/1988 | Greenhill ..................... 411/521 |
| 4,807,859 A | * | 2/1989 | Bolthouse ..................... 267/170 |
| 4,901,987 A | | 2/1990 | Greenhill et al. |
| 5,470,049 A | * | 11/1995 | Wohler et al. ............... 267/172 |
| 5,558,393 A | | 9/1996 | Hawkins et al. |
| 5,622,358 A | | 4/1997 | Komura et al. |
| 5,639,074 A | | 6/1997 | Greenhill et al. |
| 6,050,557 A | | 4/2000 | Shimoseki |
| 6,068,250 A | | 5/2000 | Hawkins et al. |

* cited by examiner

*Primary Examiner*—Chris Schwartz
(74) *Attorney, Agent, or Firm*—Piper Rudnick LLP

(57) ABSTRACT

A compression wave spring assembly including a base and a compression spring with three wave regions that are formed from a continuous elongate flat wire strip. The first wave region begins at one end of the spring with a terminal wave. The waves of the first wave region have a constant amplitude. The second wave region is positioned adjacent to the first wave region. The wave amplitude of the second wave region varies from the first wave amplitude to zero. The third wave region begins where the second wave amplitude reaches zero. The third wave region includes a zero amplitude thereby forming a flat circular shim end. The base assembly includes a recess that receives and supports the terminal wave at the non-shimmed end of the spring.

19 Claims, 3 Drawing Sheets

WAVE SPRING WITH SINGLE SHIM END

BACKGROUND OF THE INVENTION

This invention relates generally to compression springs, and, more particularly, to a compact compression spring made from an elongate flat strip which is circularly coiled and formed with a circular flat shim portion at one end of the compression spring.

Crest-to-crest compression springs are coiled springs which are typically made from a flat metal strip and formed in a generally sinusoidal wave pattern. These springs are described as "crest-to-crest" because of the particular orientation of the individual spring turns in which the crest portions of the waves of one turn abut the trough portions of the waves in the turns immediately adjacent it.

In an ordinary crest-to-crest compression spring, an imbalance of the spring occurs due to the difficulty of arranging a completely symmetrical orientation of the crests (or troughs) of successive waves of the final spring turns at the opposite ends of the spring. The compression spring naturally tilts toward the point on its ends where the spring is lacking a wave crest portion to supply the required balance to the spring as a result of the helical format. Also, a continuous coiled spring naturally possesses a helical pitch at its spring ends which results in the lack of a support surface that is perpendicular to the spring longitudinal axis.

The lack in support surface can cause an imbalance which becomes apparent when the spring is loaded, where the loading member rests on the wave crest portions of the last turn of the compression spring ends. Due to this imbalance, such compression springs can undergo uneven axial pressures when loaded. These uneven axial loads can cause the spring to exert opposite forces in both its radial and axial directions which detract from the designed load carrying ability of the spring, which is to exert a force only along the axial direction.

To minimize this imbalance problem, the compression spring designer must either increase the number of waves per spring turn to provide additional load support wave crest portions or decrease the amplitude of each wave of the entire spring to decrease the imbalance at the spring ends.

Other attempts to solve this imbalance problem have included using round wire for the compression spring in which the round wire at the opposite end portions of the compression spring are ground to form flat disc-like load support surfaces. However, this method is relatively expensive and time consuming because it requires a thick wire cross-section to provide a strong load support surface at the spring ends.

U.S. Pat. No. 4,901,987, which is assigned to the assignee of the present invention, presents a solution to the imbalance problem by illustrating a compression spring having a flat shim at each end of the spring. The compression spring is formed from a flat, elongate wire strip into a continuous circular and substantially sinusoidal wave path comprising three wave regions. The first wave region is in the center of the spring and all of the waves of the first wave region have the same amplitude. The second wave region includes a second wave portion adjacent to each side of the first wave region. The waves in the second wave portion have a diminishing amplitude which incrementally diminishes down to zero. The third wave region includes a third wave portion adjacent to each end of the second wave portions such that each third wave portion forms a flat circular shim end. The flat circular shim ends form a plane generally perpendicular to the longitudinal axis of the spring.

However, the compression spring with the two circular shim ends has disadvantages. The compression spring is cumbersome. It has a large height and weight because it requires a substantial amount of material to form the complete compression spring with two shim ends. Additionally, when the spring is under a light load, the spring tends to shift positions. Often, the edge or end of each shim end scratches and damages the surface on which it sits.

Accordingly it is an object of the present invention to provide an improved wave spring that balances the axial and radial load on the spring.

It is another object of the invention to provide a wave spring that is lighter and less expensive to manufacture.

It is another object of the invention to provide a wave spring that is compact and includes a single shim end.

It is another object of the invention to provide a wave spring assembly that includes a support surface for the non-shimmed end of the spring.

These and other objects of the present invention, as well as the advantages thereof over existing prior art forms, which will become apparent from the description to follow, are accomplished by the improvements herein after described and claimed.

SUMMARY OF THE INVENTION

The present invention is directed to a wave spring and a wave spring assembly. The wave spring includes a crest-to-crest helical spring formed from a continuous elongate wire strip with three separate wave regions. The first wave region begins at one end of the spring with a terminal wave and includes one or more spring turns. The amplitude of the waves in the first wave region is constant. The second wave region is adjacent to the first wave region. The amplitude of the waves in the second wave region vary uniformly from the amplitude of the first wave region down to a zero wave amplitude. The third wave region begins where the second wave amplitude reaches zero. The amplitude of the wave in the third wave region is a constant zero, thereby forming a flat circular shim end.

The wave spring assembly includes a base and the wave spring with a non-shimmed end and a shimmed end. The base includes an arc shaped recess with edges that align with the radius of the spring. The arc shaped recess receives the terminal wave at the non-shimmed end of the first wave region of the wave spring. The recess supports the terminal wave and prevents rotation of the wave spring around its axis.

DETAILED DESCRIPTION OF THE INVENTION

Figure 1:
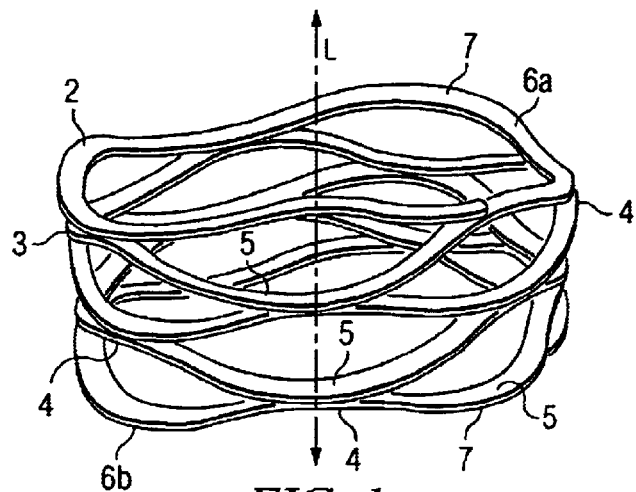
FIG. 1 is an isometric view of a conventional crest-to-crest compression spring.

FIG. 1 shows a conventional crest-to-crest compression spring 2. As can be seen in FIG. 1, each turn 3 of the compression spring includes successive wave crest portions 4 and trough portions 5 which follow a substantially sinusoidal wave path. The crest portions 4 of one spring turn abut the trough portion 5 of the spring turn lying adjacent to either above or below it. Typically the opposite ends 6a, 6b of the compression spring will terminate at the end of the last wave present in the spring turn. As such, neither of the ends of this type of compression spring presents a load support surface 7 at the spring ends which is substantially perpendicular to the spring longitudinal axis L. Rather, the last spring turn on each spring end follows a helical spiral such that it does not form a flat plane which is perpendicular to the spring longitudinal axis L. When set down on a flat surface, the compression spring 2 tends to tilt to one side either in its free state or when loaded with a work member (not shown).

Figure 2:
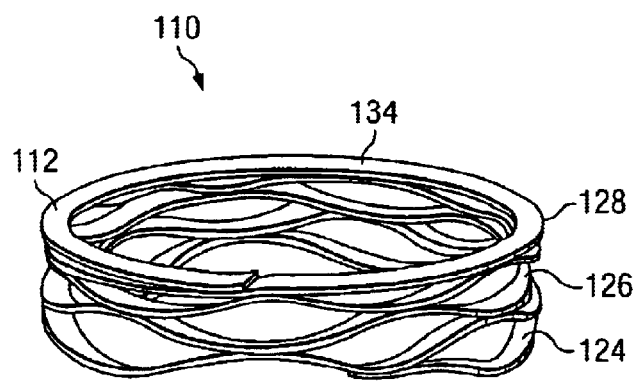
FIG. 2 is an isometric view of a compression spring constructed in accordance with the principles of the present invention.
Figure 4:
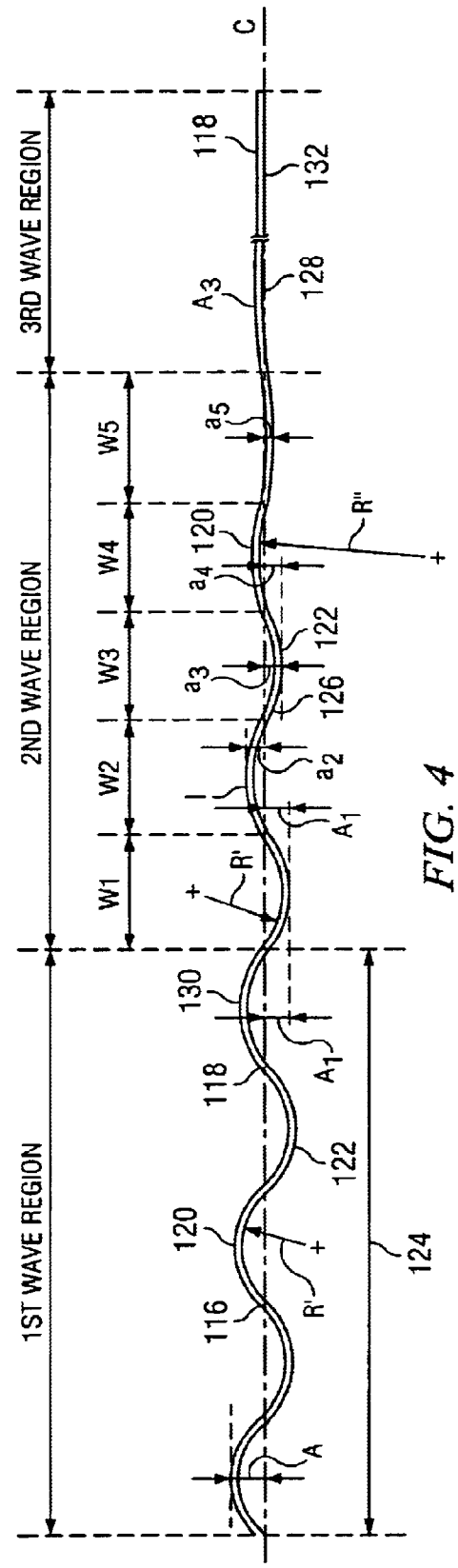
FIG. 4 is a diagrammatic view of the compression spring shown in FIG. 2.

A compression spring 110 having a circular flat shim end portion at one end constructed in accordance with the principles of the present invention is shown in FIG. 2. The compression spring 110 is formed by helically edge winding a continuous elongate flat metal strip 112 in a wave format wherein each individual spring turn is formed in a wave pattern which includes a series of waves. As illustrated in FIG. 4, each individual wave has a pair of end points 116 and 118 and includes therebetween a wave crest portion 120 which is successively followed by a wave trough portion 122. The spacing of the pattern is such that each of the wave crest portions 120 of each individual turn generally abuts trough portions 122 of the individual spring turn adjacent that crest. This particular type of spring turn configuration is commonly referred to in the art as a crest-to-crest winding.

Figure 3:
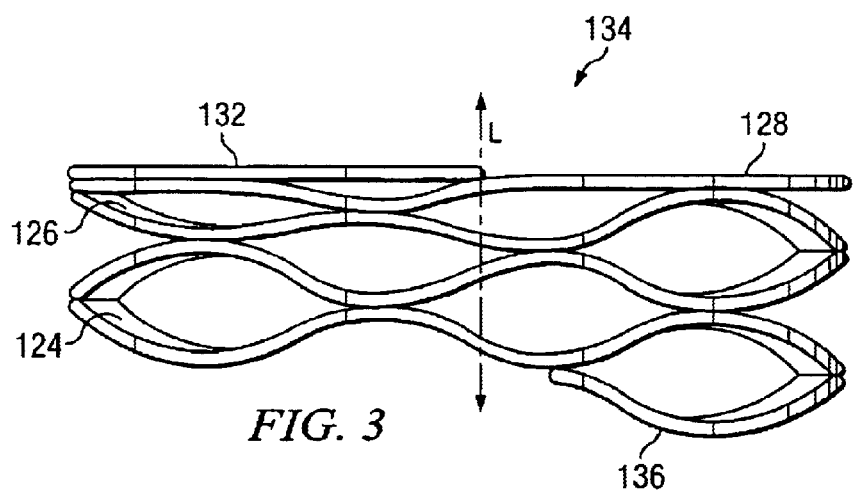
FIG. 3 is a side elevation view of the compression spring shown in FIG. 2.
Figure 3A:
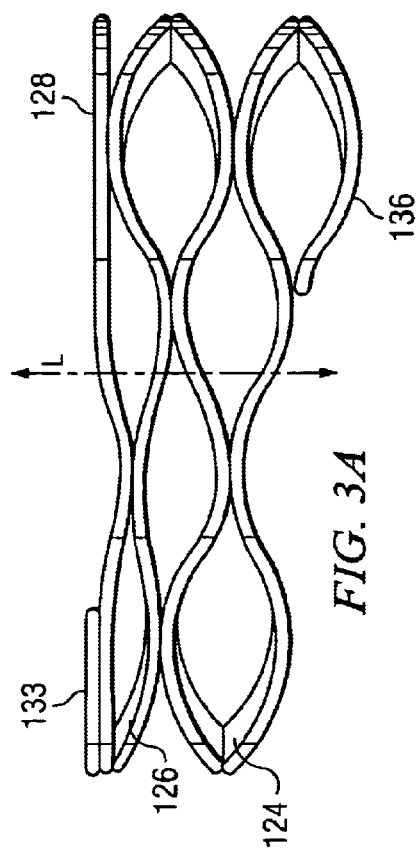
FIG. 3A is a side elevation view of the compression spring shown in FIG. 2 constructed with a reduced flat shim portion.

In one aspect of the present invention, and as is generally shown in FIG. 2, FIG. 3 and FIG. 3A, and more specifically in FIG. 4, the spring 110 significantly departs from the common crest-to-crest winding format in that the continuous strip 112 of the compression spring 110 has three distinct wave regions 124, 126 and 128 formed therein. The overall amplitude of the waves in any one of these three wave regions is generally not equal to the overall amplitude of the waves in the remaining wave regions. As used herein, the wave amplitude is defined as the distance from the spring turn centerline C to the peak of either the wave crest or wave trough. This distance is generally equal to one-half of the free height of an individual wave.

The first wave region 124 comprises at least one complete spring turn, that is, the metal strip 112 in the first wave region makes one complete revolution of 360 degrees around the longitudinal spring axis L. One end of the compression spring 110 begins with the first wave region 124. The spring turns of the first wave region 124 include a series of successive waves which define a substantially sinusoidal wave path. The amplitude $A_1$ of all of the successive waves in the first wave region 124 is a constant pre-selected amplitude.

The second wave region 126 is disposed adjacent to the end of the first wave region 124. The amplitude $A_2$ of the waves in this second wave region 126 is variable. The second wave region amplitude $A_2$ is gradually and incrementally diminished down to a zero amplitude by an incremental reduction value I. Since each individual wave contains a corresponding wave crest and wave trough, the amplitude of each successive wave crest and wave trough in the second wave region is reduced by I.

This incremental value I is obtained from the following formula:

$$I = \frac{A_1}{N}$$

where: $A_1$=the amplitude of the waves in the first wave region (in.) and N=the number of wave crest and wave trough portions found in the second wave region.

In applying the reduction value, the amplitude of the first wave crest or wave trough which begins each second wave region portion is equal to the constant wave amplitude $A_1$ of the first wave region. Successive wave crests and wave troughs in the second wave region portion gradually diminish in amplitude by I such that the final wave crest or wave trough which ends the second wave region has an amplitude equal to I.

Turning to an example of the uncoiled spring 110 shown in FIG. 4, the second wave region 126 is shown as having two and one-half waves comprising a total of five wave crest and wave trough portions, $W_1$–$W_5$, with each wave crest or wave trough portion having an individual amplitude $A_n$ associated therewith.

The wave amplitude reduction will continue until the last wave portion $W_5$ of the second wave region 126 has an amplitude equal to I. At the end of this wave trough portion the wave amplitude is zero and the third wave region 128 begins. Throughout this reduction of the second wave region amplitude, the radius of the wave portions, R increases.

Although the second wave region is illustrated as comprising a complete spring turn, a complete spring turn is not necessary. With the single shim end compression spring of the present invention, a diminishing wave region extending a complete spring turn is not critical to balance the force exerted on the spring. The transition of the second wave region's amplitude from the amplitude of the fist wave region to zero may be accomplished in as little as 30 degrees of a spring turn. Thus, the reduced transition region provides a single shim end compression wave spring that requires less material to manufacture and is considerably smaller than prior art, double shim end compression wave springs.

The third wave region 128 lies adjacent to the end of the second wave region 126. The third wave region 128 includes a portion of a spring turn in which the wave amplitude $A_3$ is zero. When a complete flat contact surface is required the third wave region spring turn is designed to extend around the compression spring's longitudinal axis L between approximately 360 and 540 degrees as shown in FIG. 2. The zero amplitude of the wave in the third wave region thereby forms a substantially flat shim portion 132 in the spring turn at the end of the spring. This shim portion 132 provides a substantially flat and uniform load support surface 134.

Alternatively, if a flat contact surface is not required, the length of the third wave region spring turn may be reduced. However, the alternative flat shim portion 133 of the third wave region 128 must be long enough to cover a majority of the second wave region 126 that is positioned below the third wave region 128. The minimum length of the alternative flat shim portion 133 depends on the number of waves in a fill 360 degree spring turn of the second wave region 126. The minimum length is obtained from the following formula:

$$A = (N-1)\left(\frac{360}{N}\right)$$

where: N=the number of waves in a 360 degree spring turn and A=the angle or length of the third wave region.

The reduced length of the third wave region maintains a sufficient load support surface for the contact member. As shown in FIG. 3A, the alternative flat shim portion 133 of the third wave region 128 combined with the final wave peak of the second wave region provide a load support for a contact member. As a result, the reduced length of the flat shim end functions the same as a full circle shim end. Additionally, the reduced circumferential length of the flat shim end reduces the weight of the spring and the materials required to form the spring.

FIG. 2, FIG. 3 and FIG. 3A illustrate the first wave region with a terminal wave 136 at the end of the spring 110. FIG. 2, FIG. 3 and FIG. 3A also illustrate the beginning crest portion of a terminal wave 136 of the first wave region coinciding with a trough portion from an above spring turn and a trough of the terminal wave 136 of the first wave region being the downward most element of the spring.

Figure 5:
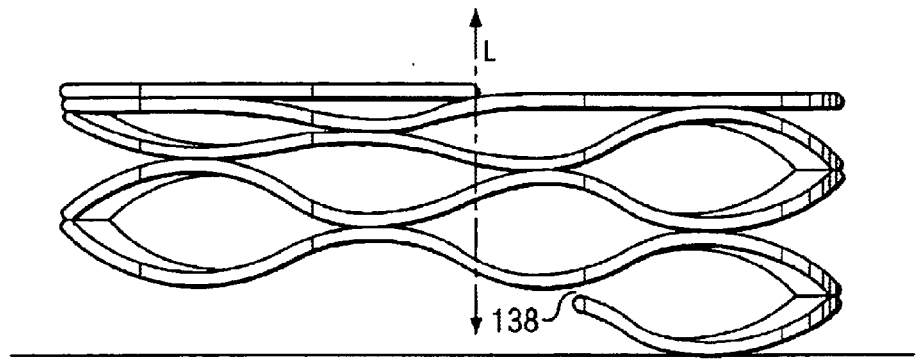
FIG. 5 is a side view of the non-shimmed end of the compression spring of FIG. 2 positioned on a flat surface.

FIG. 5 illustrates a side view of the compression spring on a flat surface. When a force is applied on the spring, the non-shimmed end of the first wave region will not scratch the supporting surface since the end of the first wave region contacts point 138, the turn immediately above it.

Figure 6:
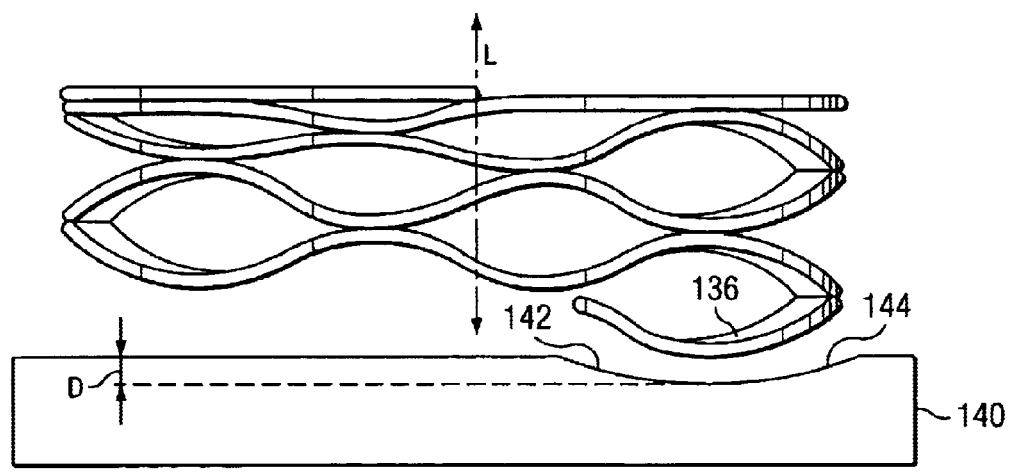
FIG. 6 is a side view of the non-shimmed end of the compression spring of FIG. 2 positioned on a receiving base.

FIG. 6 is a side view of the compression spring of the present invention inserted in a receiving base 140 of the spring assembly. The top surface of the base 140 includes a recess 142 that receives the terminal wave 136 at the non-shimmed end of the spring 110. The recess 142 is arc shaped such that the edges 144 are aligned with the radius of the compression spring 110.

Figure 7:
FIG. 7 is a top plan view of the receiving base illustrated in FIG. 6.

FIG. 7 is a top plan view of the receiving base 140. The arc shaped design of the recess 142 allows the recess 142 to capture the terminal wave 136 at the non-shimmed end of the compression spring 110. The recess 142 secures the compression spring 110 when a force is applied to compress the spring 110.

The depth D of the recess 142 may be designed so that the arc shape conforms to the terminal wave 136 at the non-shimmed end of the spring in a partially compressed state. More generally, the depth D of the recess may be equal to the wire thickness of the spring to receive a completed compressed and flat wave or the depth D of the recess may be equal to one-half of the uncompressed wave amplitude of the first wave region, or some depth in between. For the maximum capture of the terminal wave 136 and anti-rotational frictional force, the depth of the recess should be equal to the wire thickness of the spring. For the maximum capture of the spring end in an unloaded state, the depth of the recess should be equal to one-half the wave amplitude of the first wave region A.

The recess 142 is long enough to accommodate the wave length at the terminal wave 136 of the non-shimmed end of the spring 110. The width of the recess 142 is at least 5% greater than the radial wall of the spring so that the terminal wave 136 is able to be placed in the recess 142. Housing the terminal wave 136 in the recess 142 prevents the spring from rotating about its longitudinal axis and balances the spring when a force is applied.

The configuration of the compression spring assembly of the present invention enables the spring to balance axial loads with a single shim end. This is an improvement over the prior art because the compression spring is reduced in height compared to prior art compression springs. The reduced height compression spring is manufactured with less material thereby reducing the manufacturing cycle and lowering the unit cost to produce the compression spring. The reduction in material also reduces the weight of the compression spring.

The compact compression spring of the present invention may be used in areas where the spring cavity is small. The compact compression spring meets equivalent deflection and load requirements of prior art compression springs.

The single shim ended spring assembly of the present invention also prevents the abrasion of the spring end relative to the supporting surface. Often when a compression spring is under a light load, the spring rotates around its axis and shifts positions. The base assembly of the present invention positions the wave of the non-shimmed end such that the end does not contact the surface of the base. This prevents the end of the spring from scratching and damaging the supporting surface.

While the preferred embodiment of this invention has been shown and described, it will be apparent to those skilled in the art that changes and modifications may be made therein without departing from the spirit of the invention, the scope of which is defined by the appended claims.

What is claimed is:

1. A crest-to-crest generally helical spring formed around an axis, the spring comprising:
   a first wave region disposed at a first terminal end of the spring, a second wave region of the spring joining the first wave region, a third wave region of the spring joining the second wave region and disposed at a second terminal end of the spring opposite the first terminal end, the first and second wave regions including a plurality of successive spring turns each having a plurality of successive waves each having wave crest and wave trough portions;
   the first wave region including at least one spring turn, the waves in the first region having a constant non-zero amplitude;
   the second wave region having an amplitude varying from the first wave region amplitude down to zero within said second wave region; and
   the third wave region including at least a portion of a spirally wound spring turn, the amplitude of the wave in the third wave region being a constant zero amplitude so as to form a flat wave, the third wave region portion forming a flat circular shim having a substantially uniform thickness which is generally perpendicular to said axis.

2. The spring of claim 1, wherein the first wave region includes two spring turns extending 360 degrees of revolution around the axis.

3. The spring of claim 1, wherein the second wave region transitions from the first wave region amplitude down to zero within 30 degrees around the axis.

4. The spring of claim 1, wherein the first terminal end of the first wave region includes a terminating surface that coincides with the trough in the turn immediately above it such that the terminating surface of the first terminal end of the first wave region will not contact a supporting surface.

5. The spring of claim 1, wherein the first wave region includes two spring turns extending 360 degrees of revolution about the spring longitudinal axis and the third wave region includes a spring turn which extends between 270 degrees and 540 degrees of revolution about said axis.

6. The spring of claim 1, wherein the amplitude of the waves in said first wave region is equal to approximately one-half of the free height of a single turn of the central portion of the first wave region.

7. The spring of claim 1, wherein the third wave region includes a spring turn which extends between 270 degrees and 540 degrees of revolution around the axis.

8. The spring of claim 1, wherein the amplitude of waves in the second wave region decreases linearly with respect to the distance from the first wave region.

9. The spring assembly of claim 1, wherein the third wave region includes between three quarter and one half spirally wound spring turns.

10. A spring assembly comprising:
   a) a spring which is generally helical formed around an axis; said spring having
      a first wave region disposed at one terminal end of the spring including a terminal wave, a second wave region of the spring joining the first wave region, a third wave region of the spring joining the second wave region and disposed at a second terminal end of the spring opposite the first end, the first and second wave regions including a plurality of successive spring turns each having a plurality of successive waves each having wave crest and wave trough portions;
   the first wave region including at least one spring turn, the waves in the first region having a constant non-zero amplitude;
   the second wave region having an amplitude varying from the first wave region amplitude down to zero within said second wave region; and
   the third wave region including at least a portion of a spirally wound spring turn, the amplitude of the wave in the third wave region being a constant zero amplitude so as to form a flat wave, the third wave region portion forming a flat circular shim having a substantially uniform thickness which is generally perpendicular to the axis; and
   b) a base for supporting said spring, said base having a recess adapted to receive the terminal wave of the first wave region.

11. The spring assembly of claim 10, wherein the first wave region includes two spring turns each extending 360 degrees around said longitudinal spring axis.

12. The spring assembly of claim 9, wherein the second wave region transitions from said first wave region amplitude down to zero within 30 degrees around said longitudinal spring axis.

13. The spring assembly of claim 10, wherein said third wave region includes a spring turn which extends between 270 degrees and 540 degrees of revolution about said spring longitudinal axis.

14. The spring assembly of claim 10, wherein said recess is arc shaped with edges that align with the radius of the spring.

15. The spring assembly of claim 10, wherein the recess has a bottom, a trough of the terminal wave of the first wave region resting on the bottom of the recess.

16. The spring assembly of claim 10, wherein the end of the first wave region coincides with the wave trough in the turn immediately above the end.

17. The spring assembly of claim 10, wherein the recess has a depth equal to the thickness of the spring.

18. The spring assembly of claims 10, wherein the recess has a depth equal to one-half the wave amplitude of the first wave region.

19. The spring assembly of claim 10, wherein the third wave region includes between three quarter and one and one half spirally wound spring turns.

* * * * *

UNITED STATES PATENT AND TRADEMARK OFFICE
CERTIFICATE OF CORRECTION

PATENT NO. : 6,758,465 B1
DATED : July 6, 2004
INVENTOR(S) : Greenhill et al.

It is certified that error appears in the above-identified patent and that said Letters Patent is hereby corrected as shown below:

Column 7,
Line 10, delete "region includes between three quarter and one half spirally" and insert therefor -- region includes between three quarter and one and one half spirally --

Column 8,
Line 9, delete "The spring assembly of claim 9, wherein the second" and insert therefor -- The spring assembly of claim 10, wherein the second --

Signed and Sealed this

Fourth Day of January, 2005

JON W. DUDAS
*Director of the United States Patent and Trademark Office*